Patented Apr. 10, 1934

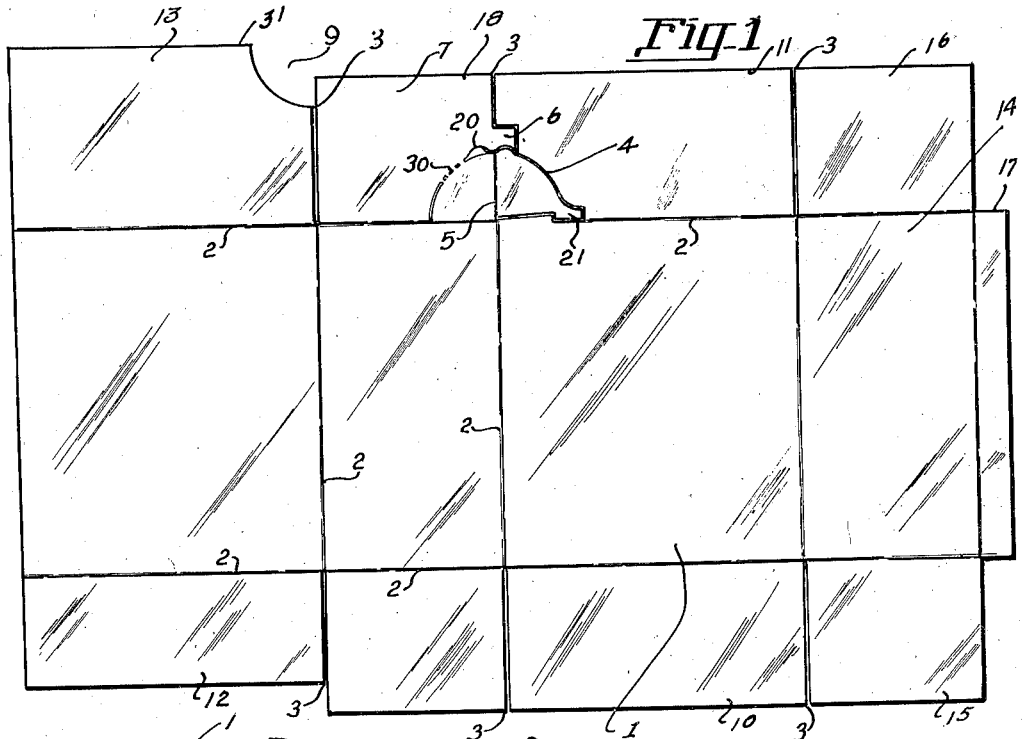
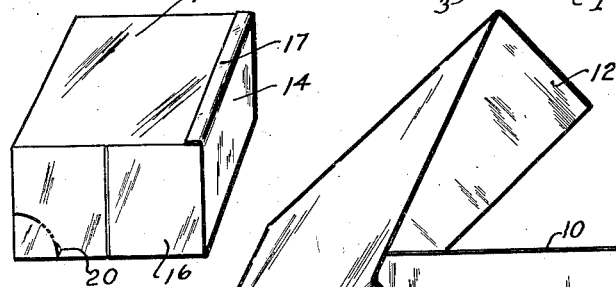
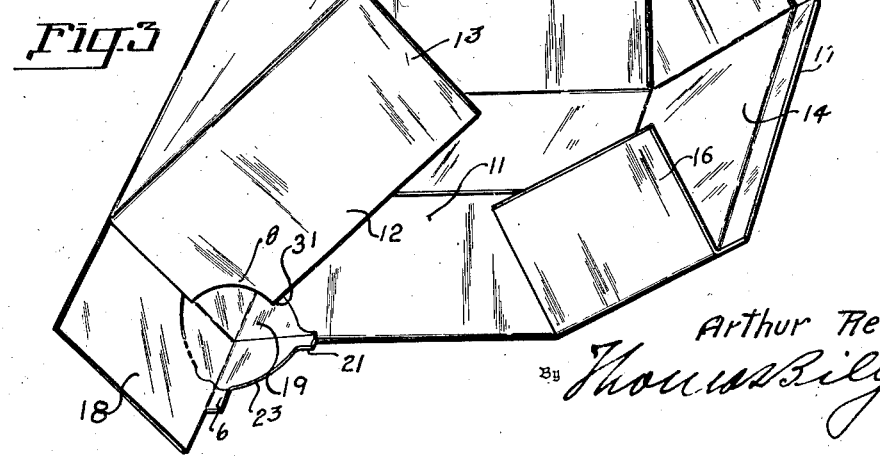

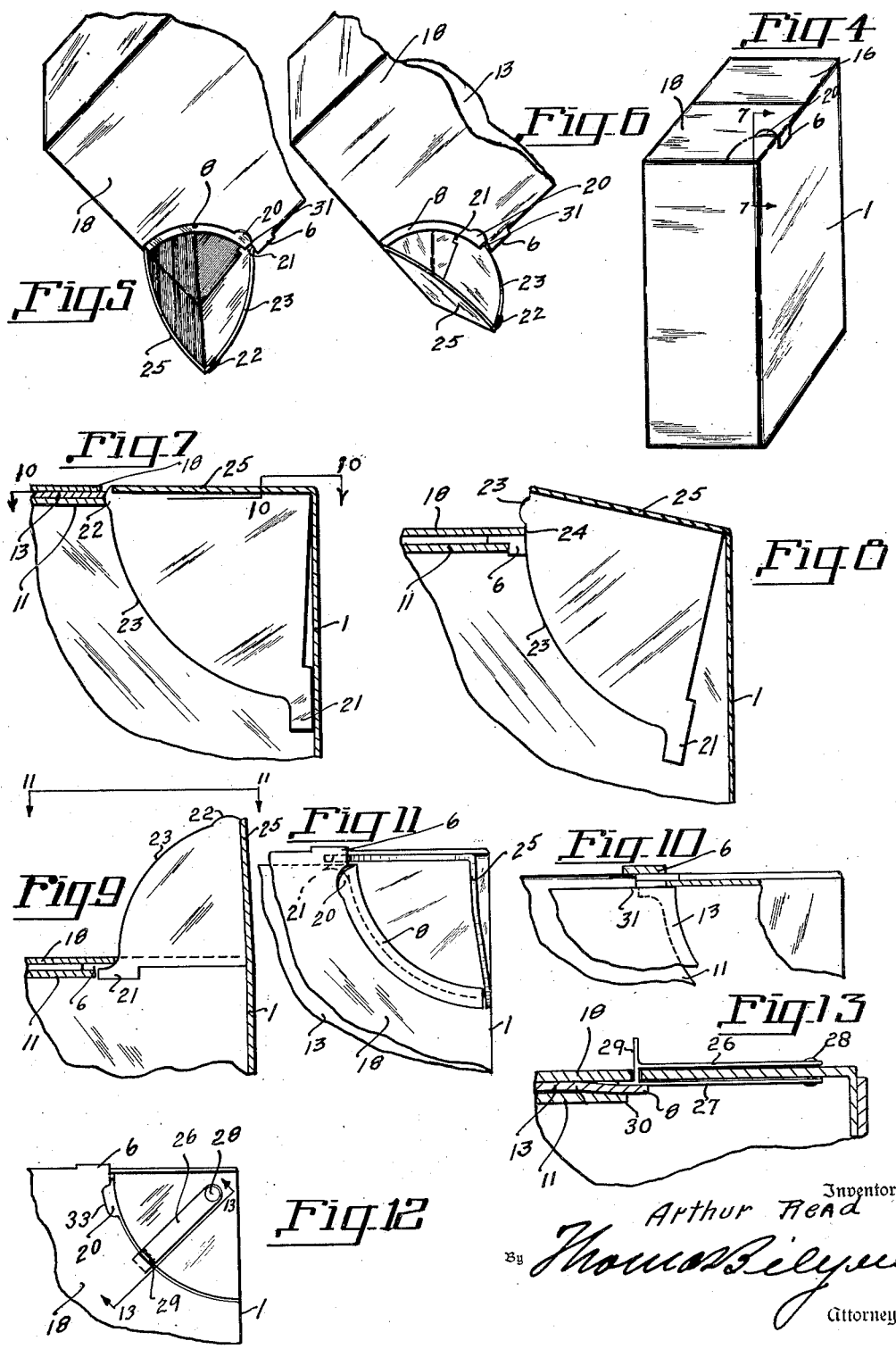

1,954,576

UNITED STATES PATENT OFFICE 1,954,576

POURING SPOUT FOR CONTAINERS

Arthur Read, Portland, Oreg., assignor to Sadie J. Douglas, Portland, Oreg.

Application July 26, 1932, Serial No. 624,769

2 Claims. (Cl. 229—17)

My invention relates to containers having pouring spouts associated therewith.

Heretofore, it has been the general custom to provide containers having spouts that are made independent of the container and secured thereto. This is a difficult thing to do, entails additional work, and expense and requires a separate and distinct operation to secure the spout to the container after the same has been made.

I form my pouring spout integral with the body of the container. The container and spout are made from a common sheet of material. The pouring spout is cut from the sheet along two of its edges. I score the sheet along the two oppositely disposed edges of the spout sufficiently to permit the hinging of the pouring spout outward and inward to open and close the opening disposed within the container and along which the same is scored.

The sheet is so scored and folded that a supporting ledge is provided for supporting the spout when the spout is closed. The ledge prevents the depressing of the spout within the container. A tab is provided at one edge of the spout that prevents the outward hinging of the spout beyond the desired placed position. A portion of the side wall of the container adjacent the spout is cut away to facilitate the opening of the spout after the same has been completely closed.

The primary object of my invention is to provide a container having a pouring spout associated therewith that may be made from a single piece of sheet material.

A further object of my invention consists in providing a container having a pouring spout associated therewith that may be comprised of a single piece of sheet material and from which a container and spout is formed, at the time the container is formed and which, when folded, prevents the pouring spout from being completely lowered into the container and which also limits the outward movement of the spout when opened.

And a still further object of my invention consists in providing a container having a pouring spout associated therewith that will not materially increase the cost of production of the container and pouring spout as a whole.

And a still further object of my invention consists in so folding the container having a pouring spout associated therewith that the container may be filled through the pouring spout when the pouring spout is opened.

A still further object of my invention consists in providing a cut-out within the end closing flaps of the container that limits the size of the pouring opening of the container and simultaneously forms a ledge upon which the one wall of the pouring spout rests when closed to thereby maintain a relatively tight bond between the spout and the end flap of the container when the spout is closed.

And a still further object of my invention consists in so forming the opening that the side wall of the pouring spout will engage the wall of the opening to thereby maintain the spout in registry alignment with the opening while being closed.

And a still further object of my invention consists in so forming the pouring spout relative to the sheet from which the container is to be formed that the pouring opening will remain leak proof during shipment and the handling of the filled package.

A still further object of my invention consists in forming a container for a pouring opening disposed therein, that has a hinged pouring spout formed integral from the stock and which is adapted for being folded and when folded to tightly close the pouring opening, this is believed to form a more sanitary container than has heretofore been made.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a plan view of a sheet that has been cut and scored and which may be folded into a container having a pouring spout associated therewith that will not materially increase the cost of the container.

Fig. 2 is a perspective, end view of the container illustrating the initial folding of the container to provide a support for the pouring spout that will prevent the depressing of the pouring spout within the container after the same has been completely folded.

Fig. 3 is a perspective, end view of the folded container, and illustrating the pouring spout closed.

Fig. 4 is a perspective side view of the folded container and illustrating the pouring spout in closed position.

Fig. 5 is a fragmentary, perspective, end view, of the container illustrating the pouring spout open.

Fig. 6 is a fragmentary, perspective, end view of the container, illustrating the pouring spout as being partially closed.

Fig. 7 is a fragmentary, sectional, side view, of the container and of the pouring spout and illustrating the pouring spout completely closed. This view is taken on line 7—7 of Fig. 4, looking in the direction indicated.

Fig. 8 is a fragmentary, sectional, side view, of the container and of the pouring spout and illustrating the pouring spout being partially open. This view is made to particularly illustrate the projecting lug associated with one edge of the pouring spout. The lug normally maintains the pouring spout closed when fully closed. This view illustrates the tab, associated with the one edge of the pouring spout that is adapted for preventing the abnormal outward hinging of the spout when the spout is opened.

Fig. 9 is a fragmentary, sectional, side view of the container and pouring spout and illustrating the pouring spout in full open position, and illustrating the locking tab that prevents the abnormal opening of the pouring spout.

Fig. 10 is a fragmentary, sectional, top plan view of one corner of the container and of the pouring spout and illustrates the pouring spout in full closed position. This view is taken on line 10—10 of Fig. 7, looking in the direction indicated.

Fig. 11 is an inverted, top, plan view, of the container and pouring spout and illustrates the pouring spout open.

Fig. 12 is a top, plan view of a modified form of device illustrating a hinged locking latch associated with the pouring spout.

Fig. 13 is a fragmentary, sectional, side view of the container and the pouring spout and locking latch. This view is taken on line 13—13 of Fig. 12, looking in the direction indicated.

Like reference characters refer to like parts throughout the several views.

I form a blank carton from a sheet 1 and score the sheet to facilitate folding, as illustrated at 2, in Fig. 1. The sheet from which the carton is to be made is cut, as illustrated at 3, to form the end wall members. The pouring spout is formed from the sheet by cutting the pouring spout, as illustrated at 4. The pouring spout forming member is scored at 5, to facilitate the folding of the pouring spout member. A locking tab 6 is cut and formed integral with the end forming flap 7. A ledge 8 is provided for supporting the pouring spout, when the pouring spout is fully closed. By the cutting out of a quarter circular piece 9 at the time the blank sheet and pouring spout is formed, the pouring opening and support for the closed spout is formed.

In the initial folding of the container the end walls 10 and 11 are initially folded, and the end walls 12 and 13 are made to engage outside of the end walls 10 and 11. After the container is thus being initially folded, as illustrated in Fig. 2 along the scored lines adjacent the pouring spout, the side wall 14 is then folded into position with the flaps 15 and 16 being folded into position. The locking strip 17 is then folded into place. The end flap 18 is finally folded. The pouring spout is held fixed to the end flap 18 as it is folded into place.

If the container is to be filled with the material through the pouring spout, the end flap may be left unfolded to thereby leave the pouring spout in open position at which time the container may be filled through the opening 19, thereafter the flap 18 is folded into position which automatically closes the opening, with the spout in full lowered and in closed position.

In order to facilitate the opening of the pouring spout I cut out a portion 20 of the end flap 7. When the container is completely closed the finger, or thumb nail, or any other suitable opener may be inserted thereinto, or below the lip of the pouring spout.

A tab 21 is formed integral with the pouring spout and adjacent one edge of the pouring spout. The purpose and object of the tab is to form a device that prevents the abnormal opening of the pouring spout. This tab engages beneath the tab 6 when the container is completely folded and the pouring spout is in placement.

A locking lug 22 is provided upon the edge 23 of the pouring spout. This locking lug is so positioned and placed that the placing of the same into position against the edge 24 of the end flap 11 normally maintains the pouring spout in locked placement. In order that the top of the container may finish flush and the pouring spout be not unduly depressed within the container, the underside 25 of the pouring spout is made to rest upon the supporting ledge 8 of the end flap 11.

It will thus be seen that I have provided a container having a pouring spout formed integral therewith from a single sheet of material without the use of metal parts, or other spout forming parts that are required to be secured to the container forming member either before, or after the container has been folded.

For certain classes of merchandise and especially for the larger sizes of containers it may be found desirable to secure a hinged lifting bar to the pouring spout of the container. Where this is found necessary, the hinged member may be comprised of rearwardly extending arms 26 and 27 and the same are hingedly secured to the pouring spout by a hinge pin 28. A hand engaging tip 29 upwardly extends from the arm and a locking ledge 30 is made to engage between the end flaps 31 and 32 which definitely locks the pouring spout closed until the locking latch 30 is made to again register with the opening 33 disposed within the end flap 31 at which time the spout may be hinged upward by applying lifting pressure to the tip 29. The closing of the spout and the turning of the assembly about the hinge pin 28 again locks the pouring spout closed. This additional unit is only required for special products and may be found desirable in the larger sizes of containers.

In certain classes of merchandise it may be found desirable to leave a portion of the pouring spout forming sheet uncut, as illustrated at 30, in Fig. 1. This uncut portion will maintain the spout forming portion of the sheet in placement and in alignment during folding and during the forming of the container.

In the cutting out of the circular piece 9 the arc of the circle is so provided and the radius inscribed is such that the ledge 8 is formed upon which the spout comes to rest when folded and prevents the spout entering the container and prevents leaks when the spout is folded. Simultaneously therewith the edge 31 of the flap 13 forms a guide for the side wall of the spout and maintains the same in true alignment while being closed.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. A device of the class described comprising a sheet of material scored into a plurality of panels for folding into a container and cut inwardly from certain of its edges to form overlapping panels when folded, the abutting edges of two of said panels being cut to form a semi-circular portion having a center line in continuity with one of the longitudinal scores of the container, said semi-circular portion forming a pouring spout having two equal sides and movable independently of the container when folded, one side of said spout being formed integral with one panel of the carton, and the other side being free of its adjacent panels and formed with a projection at its outermost free end, the panel adjacent the integral side of said pouring spout being formed with a projection adapted to overlie and be secured to one wall of the carton in the path of movement of the projection formed on the free side of the pouring spout and to provide a limit stop for the outward movement of the pouring spout.

2. A carton of the class described, comprising side walls and overlapping end walls, a pouring spout formed integral along one of its edges with one of said side walls and adapted to be swung into and out of said carton, a projection formed integral with one wall of said pouring spout, one of said end walls formed with a projection adapted to overlie and be secured to one of said side walls in the path of movement of said projection on the pouring spout to form a limit stop for the outward movement of the pouring spout.

ARTHUR READ.